Figure 1:
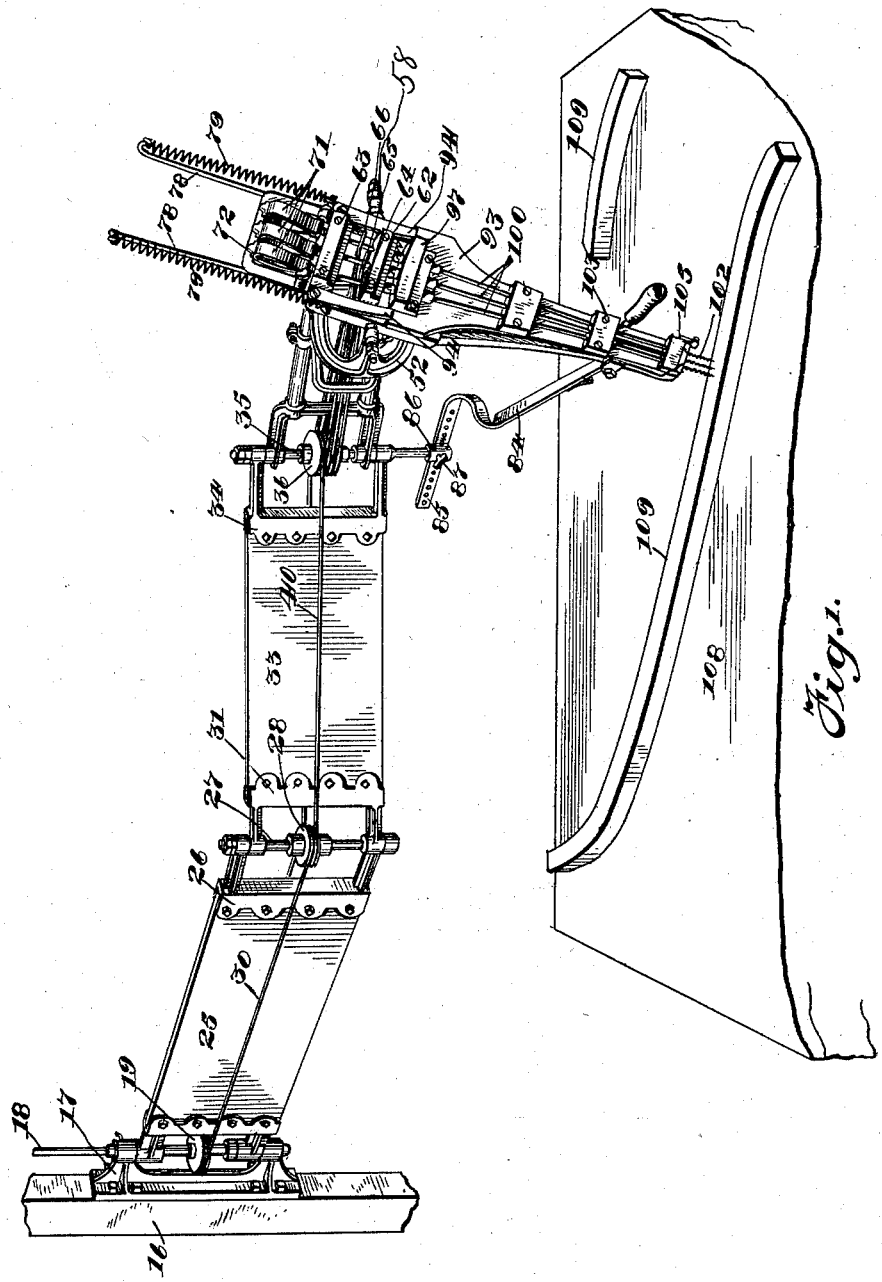

No. 749,821. PATENTED JAN. 19, 1904.
T. C. HANSEN.
DRILLING MACHINE.
APPLICATION FILED JULY 26, 1902.
NO MODEL. 5 SHEETS—SHEET 1.

Witnesses:
JB Weir
H. M. Krueger

Inventor:
Theodore C. Hansen
by Bond, Adams, Pickard & Jackson
Attys

No. 749,821. PATENTED JAN. 19, 1904.
T. C. HANSEN.
DRILLING MACHINE.
APPLICATION FILED JULY 26, 1902.
NO MODEL. 5 SHEETS—SHEET 2.
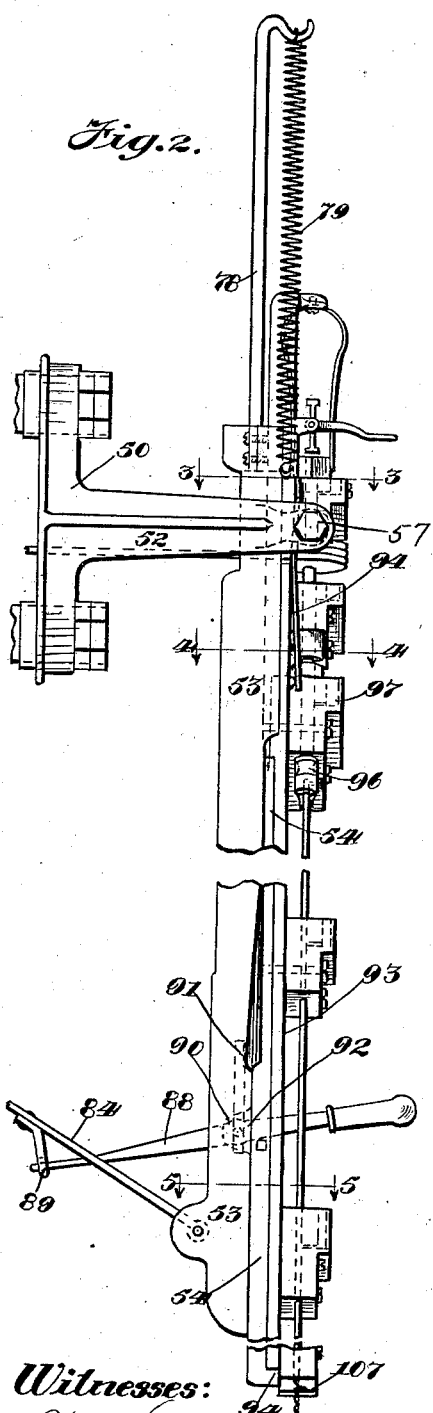
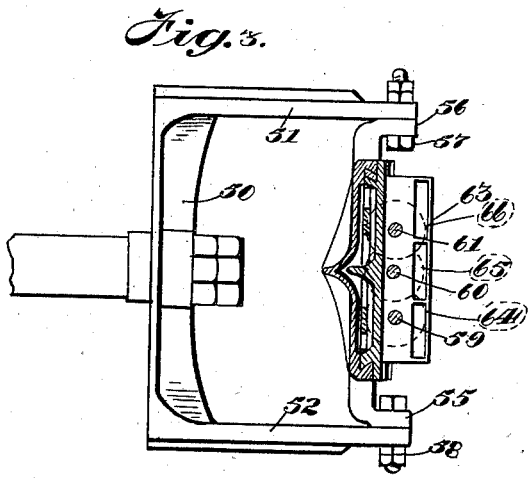
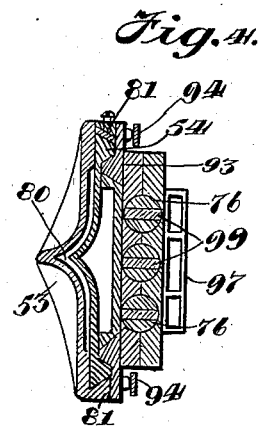
Witnesses:
Inventor:
Theodore C. Hansen

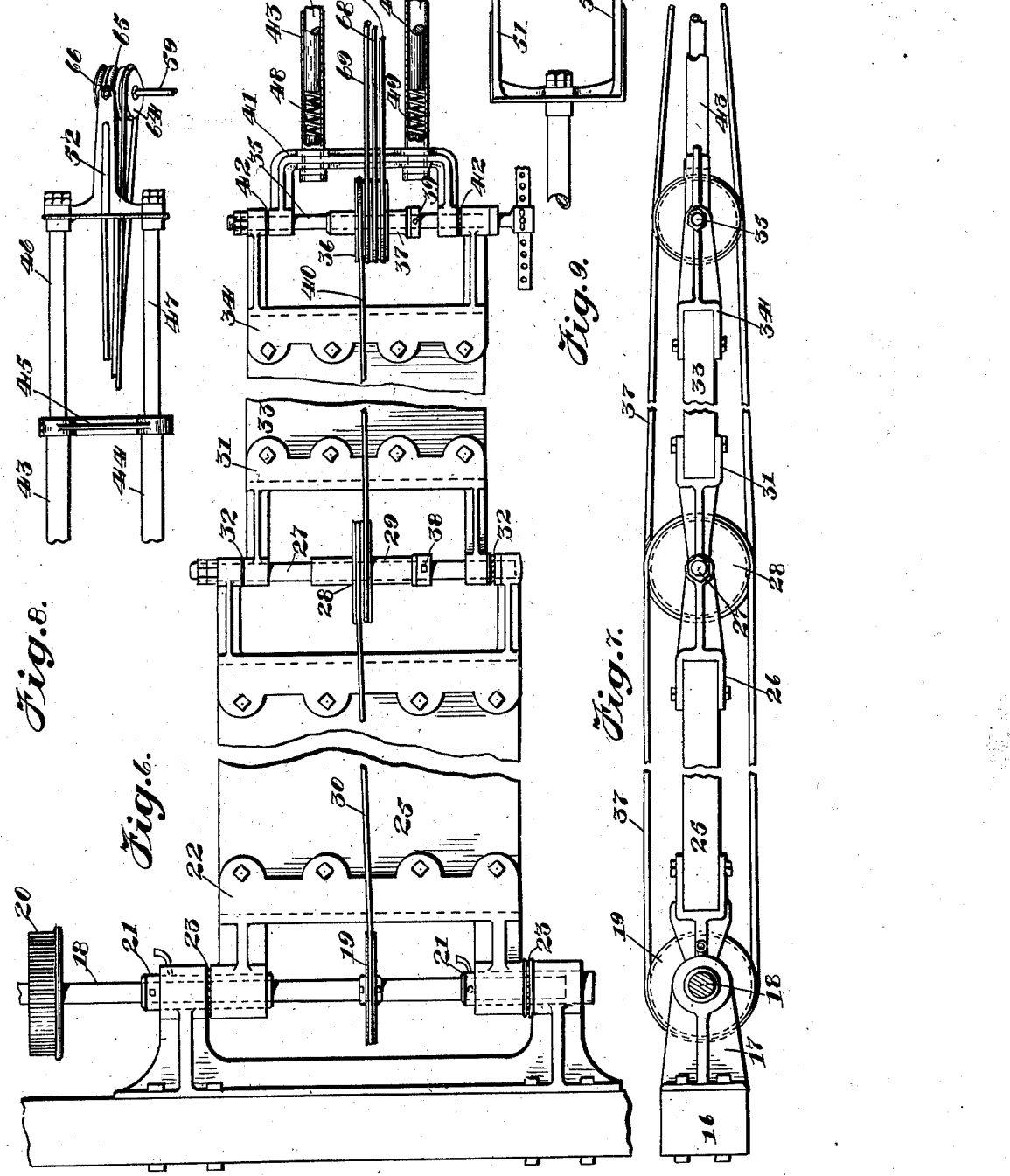

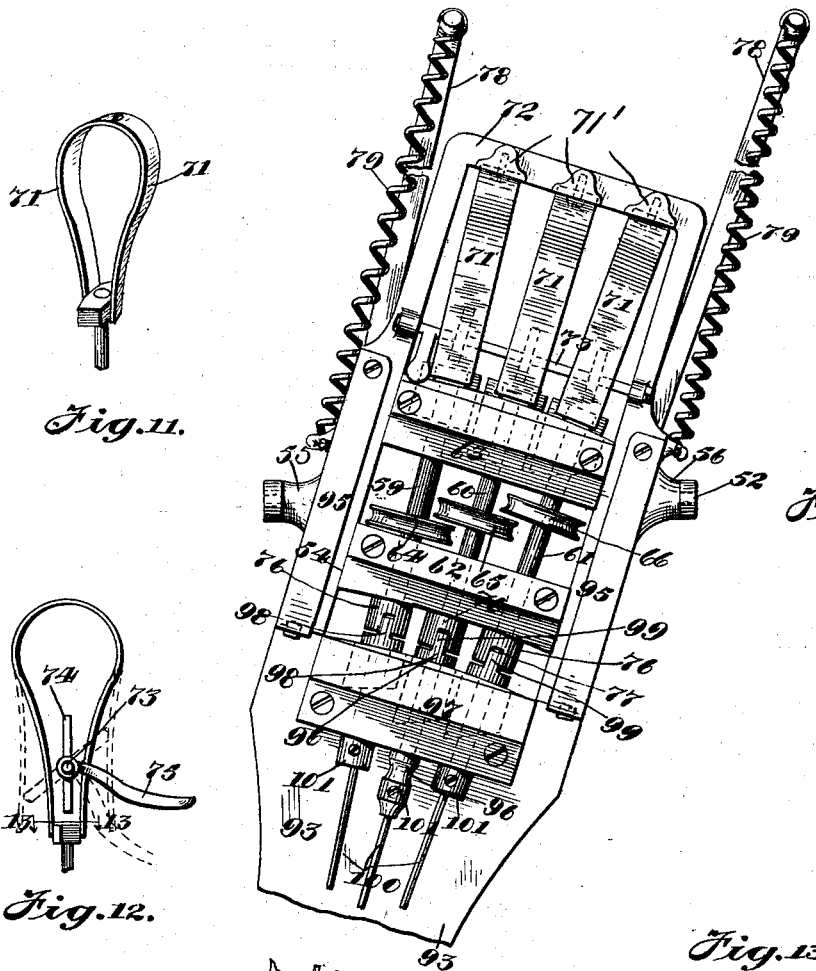

No. 749,821. PATENTED JAN. 19, 1904.
T. C. HANSEN.
DRILLING MACHINE.
APPLICATION FILED JULY 26, 1902.
NO MODEL. 5 SHEETS—SHEET 5.
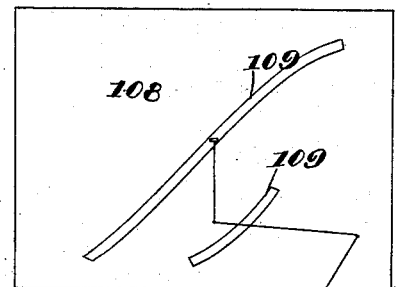
Fig.15.
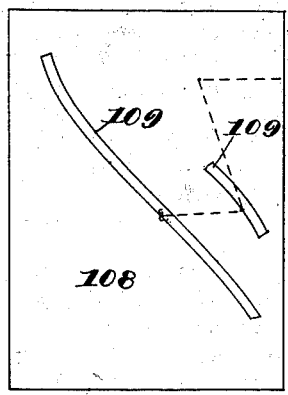
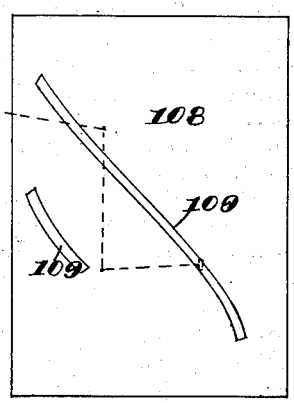
Fig.14.
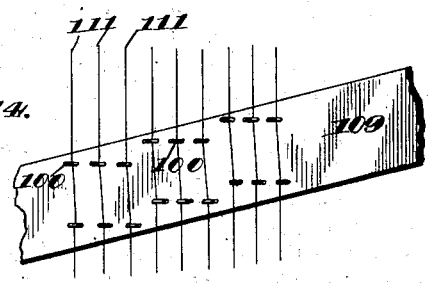
Witnesses:
JBWeir
H. M. Krueger.
Inventor:
Theodore C. Hansen
by Bond, Adams, Pickard & Jackson
Attys No. 749,821. Patented January 19, 1904.

UNITED STATES PATENT OFFICE.

THEODORE C. HANSEN, OF CHICAGO, ILLINOIS.

DRILLING-MACHINE.

SPECIFICATION forming part of Letters Patent No. 749,821, dated January 19, 1904.

Application filed July 26, 1902. Serial No. 117,141. (No model.)

*To all whom it may concern:*

Be it known that I, THEODORE C. HANSEN, a citizen of the United States, residing at Chicago, in the county of Cook and State of Illinois, have invented certain new and useful Improvements in Drilling-Machines, of which the following is a specification, reference being had to the accompanying drawings.

My invention relates to drilling-machines, and particularly to drills adapted to bore a series of sets of holes for the pins on piano-bridges and for similar purposes in which it is desired to bore a number of sets of equidistant holes with two or more holes in each set on the same line with each other and with the sets of holes parallel to each other. In such cases, and particularly in the boring of holes in bridges of the sounding-boards of pianos, it is desirable to so mount the drill that several of the sounding-boards of pianos may be placed around it and that the drill may be swung from one to the other in such a way that the operative drilling-points may be always applied at the proper position and so that as it is swung the lines of holes may be kept parallel with each other.

My invention has for a further object the improvement of drills in sundry details hereinafter pointed out.

That which I regard as new will be set forth in the claims.

In the drawings, Figure 1 is an isometric view of the drill and its mountings. Fig. 2 is an enlarged detail, being a side elevation of the drill and drill-supporting mechanism, partly broken away. Fig. 3 is an enlarged detail, being a section on line 3 3 of Fig. 2. Fig. 4 is an enlarged detail, being a section on line 4 4, of Fig. 2. Fig. 5 is an enlarged detail, being a section on line 5 5 of Fig. 2. Fig. 6 is an enlarged detail, being a side elevation of the supporting-frames of the drill, partly broken away for convenience of illustration. Fig. 7 is an enlarged detail, being a top or plan view of the parts shown in Fig. 6. Fig. 8 is an enlarged detail, being a side view of the swinging end of the frame not shown in Fig. 6. Fig. 9 is an enlarged detail, being a top or plan view of a portion of the frame supporting the drill-carrying mechanism. Fig. 10 is an enlarged detail, being a front view of the drills and supporting-plates. Fig. 11 is an enlarged detail, being an isometric view of the springs for holding the drill-driving shafts in engaging position. Fig. 12 is an enlarged detail, being a side view of the same device shown in Fig. 11 with its operating-lever. Fig. 13 is an enlarged detail, being an enlarged section on line 13 13 of Fig. 12. Fig. 14 is a detail showing the typical setting of pins in a portion of a piano-bridge, and Fig. 15 is a diagrammatic view showing the position taken by the drill and its supporting-frames in operating in different positions.

16 indicates a support to which is secured a bracket 17.

18 indicates a shaft which is journaled in the bracket 17 and which carries a driving-pulley 19, secured thereto. The shaft 18 is driven by a driving-pulley 20, connected with any suitable source of power. Upon bearings 21 on the shaft 18 is journaled a bracket 22, which is provided with suitable ball-bearings 23. To the bracket 22 is secured a connecting-frame 25, which may be swung laterally from side to side on the bearings of the bracket 22.

26 indicates a bracket which is secured to the outer end of the frame 25 and carries a pin 27.

28 indicates a pulley provided with a sleeve 29 and journaled upon the pin 27.

30 indicates a belt which connects the pulleys 19 and 28.

31 indicates a bracket which is journaled upon the pin 27, provided with suitable ball-bearings 32.

33 indicates a frame which is secured to the bracket 31, so that the frame and the bracket may be swung laterally upon the pin 27.

34 indicates a bracket which is secured to the outer end of the frame 33.

35 indicates a pin which is supported at the outer end of the bracket 34.

36 indicates a four-grooved pulley which is secured to a sleeve 37, which is journaled upon the pin 35. The pulleys 28 and 36 are held in suitable position upon the pins 27 and 35 by means of set-screws 38 39, which engage, respectively, with suitable circumferential grooves in the pins 27 and 35.

40 indicates a belt which connects the pulleys 28 and 36.

41 indicates a bracket which is journaled upon the pin 35 and provided with suitable ball-bearings 42.

43 44 indicate forward-projecting tubes which are secured to the bracket 41. The bracket 41 and tubes 43 44 may be swung laterally upon the pin 35. The outer ends of the tubes 43 44 are supported by a bracket 45, which is secured to the outer ends of said tubes and holds them parallel and rigidly in position.

46 47 indicate rods which are of suitable size to slide freely but smoothly inside the tubes 43 44.

48 49 indicate springs which are located inside the tubes 43 44 between the inner ends of the rods 46 47 and whose tendency is to push the rods outward.

50 indicates a bracket which is secured upon the outer end of the rods 46 47 and is provided with a fork consisting of two arms 51 52.

53 indicates a support which is provided with arms 55 56 upon each side. These arms 55 56, as best shown in Fig. 10, are located at different distances from the end of the support 53, so that when the same is in position, as hereinafter described, the support 53 will project downward on an incline, as is best shown in Figs. 1 and 10. The incline at which this support will be held will depend upon the inclination at which it is desired to bore the holes, as hereinafter described. The arms 55 56 fit between the arms 51 52, Fig. 3, on which they are supported by means of bolts 57 58, which pass through the ends of the arms 51 52 and through the arms 55 56, whereby the support 53 is hung from the fork of the bracket 50 in such a way as to swing therein.

54 indicates a plate which is carried upon the support 53, so as to slide longitudinally of itself thereon in the manner hereinafter described.

59 60 61 indicate shafts which are journaled in suitable bridges 62 63 near the upper end of the plate 54. The bridges 62 63 project forward a suitable distance from the front surface of the sliding plate 54 to bring the shafts 59 60 61 into alinement with the drills hereinafter described.

64 65 66 indicate pulleys which are keyed, respectively, to the shafts 59 60 61.

67 68 69 indicate belts which connect the pulleys 64 65 66, respectively, with the pulley 36, the said belts passing around three of the grooves in the pulley 36. It will be noticed that the effect of the springs 48 49 bearing upon the rods 46 47 will be to force them outward and keep the belts 67 68 69 constantly at suitable tension.

The upper ends of the shafts 59 60 61 are each provided with a hexagonal block 70, which is secured thereto in any appropriate manner. The shape of this hexagonal block is best shown in Fig. 13. The two broadest sides 70$^a$ are symmetrical with reference to each other and opposite each other and symmetrical with relation to the axis of the block.

71 indicates U-shaped springs which are secured, by means of screws, (shown in dotted lines,) to brackets 71', carried by an upward-projecting frame 72, secured to the upper end of the plate 54. The lower ends of the springs 71 embrace the blocks 70, as is best shown in Figs. 11, 12, and 13.

73 indicates a rock-shaft pivoted on the frame 72 between the sides of the U-shaped springs 71 near their lower ends. The rock-shaft 73 is provided with arms 74, which are adapted when said shaft is rocked to bear upon the opposite inside surfaces of the lower ends of the springs 71 and throw them apart into the position shown in dotted lines in Fig. 12, so as to permit the block 70 to rotate freely between them.

75 indicates a thumb-piece which is secured to one end of the rock-shaft 73 and by means of which the shaft 73 may be rocked, as above described.

It will be observed that the shape of the block 70 is such that when the springs 71 are free to act they will tend to hold the block in position only when they bear upon the surfaces 70$^a$ and if they bear upon any of the other surfaces will tend to rotate the block until they engage the surfaces 70$^a$.

The lower ends of the shafts 59 60 61 are provided with blocks 76, keyed or otherwise rigidly secured thereto. The lower ends of the blocks 76 are provided with transverse grooves 77, extending across from side to side and at right angles with the surfaces 70$^a$ of the block 70, whereby when the blocks 70 are at rest in the position shown in Fig. 13 the grooves 77 will be at right angles with the surface of the plate 54 for the purpose hereinafter described and lie in the position shown in Fig. 10.

78 indicates arms projecting upward from the end of the support 53.

79 indicates spiral contraction-springs which connect the upper ends of the arms 78 with the sliding plate 54 and tend to draw said plate upward when pulled downward for the purpose of drilling, as hereinafter described. The lower end of the support 53 is preferably so shaped as to provide a recess 80 on its front surface, as is best shown in Figs. 4 and 5, and is also provided with dovetailed shoulders 81, with which the sides of the plate 54 near its upper end engage, the sides being parallel with each other for a suitable distance for that purpose, so as to permit a movement of the plate 54 longitudinally of itself in the support 53. The lower end of the support 53 is also provided with dovetailed shoulders 82, which engage with suitable shoulders 83 on the sides of the sliding plate 54 near its lower end, said sides being parallel for a suitable distance for said purpose. The plate 54 is thus mounted on the support 53 in such a way as to slide longitudinally of itself thereon.

84 indicates an arm which is pivotally connected at its forward end with the back of the support 53 and is provided with a series of holes 85 on its rear end. The rear end of the arm 84 is constructed so as to pass through a suitable opening in a block 86 on the lower end of the pin 35.

87 indicates a set-screw which is adapted to engage with the holes 85. By loosening the set-screw and moving the arm 85 forward or back in the block 86 the plate 53 will be swung in its bearings, so as to vary its position to and from the vertical.

88 indicates a lever one end of which is pivoted in a lug 89 on the arm 84. The lever 88 is provided with a pin 90, which passes through a suitable slot 91 on one side of the support 53 and engages with a lug 92 on the rear of the sliding plate 54. By movement of the lever 88 up and down the plate 54 will be slid longitudinally of itself on the support 53.

93 indicates a drill-carrying plate which is removably mounted on the front surface of the sliding plate 54. The sliding plate 54 is provided at its bottom surface with a shoulder 94, which is adapted to receive the lower end of the drill-carrying plate 93. The lower end of the drill-carrying plate is placed in position on the shoulder 94 and then laid back against the sliding plate 54 and is held in position by means of springs 95. As is best shown in Fig. 4, the lower end of the sliding plate 54 is recessed in its front surface to receive a suitable shoulder 93$^a$ on the rear surface of the drill-carrying plate 93, the rear surface of the plate upon each side of said shoulder resting against the front surface of the plate 54. The springs 95 may be turned to one side when it is desired to insert or take out the drill-carrying plate 93.

96 indicates shafts which are journaled in a bridge 97, projecting from the front surface of the drill-carrying plate 93. The shafts 96 are provided with heads 98, each of which is provided with a key 99, projecting from its upper surface. The keys 99 are adapted to enter and register with the slots 77 on the heads 76, and the bridge 97 is so constructed that when the plate 93 is in position, as above described, the shafts 59 60 61 are in alinement with the shafts 96 and the heads 76 are in alinement with the heads 98. It is to be observed that when the machine is at rest, as was said above, the heads 76 will be held in the position shown in Fig. 10 by means of the action of the springs 71—that is to say, with the slots 77 lying at right angles with the surface of the plate, the heads 98 being turned with their keys 99 in corresponding position. When the plate 93 is put back in position, the keys 99 will enter the slots 77 and engage the same, so that when the shafts 59 60 61 are rotated by the action of the belts above described the drill-carrying shafts 96 will be rotated with them.

100 indicates drill-shafts which are somewhat flexible and removably mounted at their upper ends in heads 101 on the lower ends of the shafts 96. The drill-shafts 100 are provided with drills 102 on their lower ends and pass through bridges 103 104, which are provided with Babbitt bearings 106 (see Fig. 5) for the drill-shafts. As it is usually necessary in the work for which this machine is particularly designed to have the holes bored by the drills quite close together, the lower ends of the drill-shafts are somewhat closer together than the upper ends, and for this purpose they are constructed of suitable flexible steel, as above suggested, and the openings in the Babbitt bearings through which they pass are so adjusted that the drill ends will be parallel with each other.

107 indicates an adjustable stop which is mounted upon the lower end of the sliding plate 54 and is adapted to limit its downward motion when driven.

Referring particularly to Figs. 1, 14, and 15, 108 indicates the sounding-boards of pianos, having bridges 109, in which it is desired to bore holes for the insertion of pins 110, against which the wires 111 are strung. (See Fig. 14.) As will be apparent from the diagrammatic view in Fig. 15, the drill may be swung around so as to operate upon each one of the piano sounding-boards, and the frame carrying the drill is of three parts hinged together so that they may swing laterally from their support and laterally on each other. Not only can the drill be swung around into any desired position on the several sounding-boards grouped about the drill, but also the drill-points can be kept traveling in such a way that their successive boring positions will be parallel with each other—that is to say, so that the sets of holes which are bored by the three drills, in case three are used, as illustrated, may be parallel with each other. This, it is obvious, could not be done if the framework consisted of only two parts, although by constructing it of two parts it might be swung around into proper position. It could, however, be done if the supporting-frame consisted of more than three parts; but as this object can be accomplished by a three-part hinged framework I prefer to construct it in that way, although I do not wish to limit my invention in this respect to a three-part hinged framework. It is necessary, in other words, for the accomplishment of this object that the framework should consist of a plurality of frames greater than two in number and hinged so that the framework may swing as a whole and so that each of the parts may swing laterally upon the other.

It will be obvious from the above description that when the shaft 18 is driven the shafts 59 60 61 will be rotated by means of the several pulleys and bands, and the drills will be driven thereby. The parts being in position as above described, the objects to be drilled are disposed around the drill in any convenient manner—such, for instance, as is illustrated in Fig. 15—and the drills being set in motion by connecting the shaft 18 with the source of power the operator by grasping the support 53 or the arm 84 or any other suitable portion of the machine may swing it around from place to place where it is desired to drill the holes, and when the drills are in suitable position by working the lever 88 up and down by means of the handle on its outer end the sliding plate 54, with the drill-carrying plate 93, is correspondingly moved up and down, thus carrying the drills down into the object to be bored as they rotate and lifting them out when a suitable depth is reached, determined, as was said above, by the stop 107. While the machine is drilling the thumb-piece 75 will be thrown down into the position shown in dotted lines in Fig. 12, separating the sides of the spring 71, so as to allow the blocks 70 to rotate freely. When it is desired to remove the drill-carrying plate 93 in order to substitute another plate carrying a different number of drills or for any other purpose, the power is disconnected from the machine, the thumb-piece 75 thrown up into the position shown in solid lines in Fig. 12, freeing the springs from engagement with the arms 74, when they will bear upon the blocks 70 and stop them in the positions shown in Figs. 10 and 13, and the drill-carrying plate 93, it will readily be seen, can easily be removed by pulling it forward, the keys 99 being thus in position to disengage from the slots 77. As was suggested above also the position of the drills and the angle at which they will enter the object to be bored may be varied in one direction by adjusting the arm 84 in the head 86, as above described.

I have described my device, and, as shown, it is especially constructed for the drilling of pin-holes in the bridges of sounding-boards of pianos; but it is obvious that my invention might be applied to other purposes, and I therefore do not confine myself to a drill for boring such bridges.

That which I claim as my invention, and desire to secure by Letters Patent, is—

1. In a drilling-machine, a drill-carrying frame comprising three or more sections hinged together, the hinge-axes of said sections being parallel with each other, and a plurality of drills carried by the outer of said sections, the arrangement of said frame and said drills being such that a plurality of sets or series of holes may be drilled, each set or series of holes being parallel with the other sets or series.

2. In a drilling-machine, a support, a drill-carrying frame rigid vertically on said support, said frame comprising three or more sections hinged together, the hinge-axes of said sections being parallel with each other, and a plurality of drills carried by the outer of said sections, the arrangement of said frame and said drills being such that a plurality of sets or series of holes may be drilled, each set or series of holes being parallel with the other sets or series.

3. In a drilling-machine, the combination with a support, of a drill-carrying frame hinged to said support and rigid vertically thereon, consisting of three or more sections rigid vertically and hinged together, whereby each may be swung laterally upon the other, a support pivotally mounted on the outer end of said last section so as to swing vertically thereon, a drill-supporting plate carried by said support and longitudinally movable thereon, means for moving said plate longitudinally, drilling mechanism mounted on said plate, and means for driving said drilling mechanism, substantially as described.

4. In a drilling-machine, the combination with a support, of a frame-section vertically hinged to said support and rigid vertically thereon, a second frame-section hinged to said first frame-section, rigid vertically and capable of being laterally swung thereon, a bracket vertically hinged to said second frame-section, tubes carried by said bracket, spring-seated rods slidingly mounted in said tubes, a bracket carried on the outer end of said rods, a drill-support pivotally mounted and capable of being vertically swung thereon, drill mechanism carried by said support, and means for driving said drilling mechanism, substantially as described.

5. In a drilling-machine, the combination with a support, of a frame-section vertically hinged to said support and rigid vertically thereon, a second frame-section hinged to said first frame-section, rigid vertically and capable of being laterally swung thereon, a bracket vertically hinged to said second frame-section, tubes carried by said bracket, spring-seated rods slidingly mounted in said tubes, a bracket carried on the outer end of said rods, a drill-support pivotally mounted and capable of being vertically swung thereon, a plate carried by said drill-support and movable longitudinally thereon, drilling mechanism carried by said longitudinally-movable plate, means for moving said longitudinally-movable plate, and means for driving said drilling mechanism, substantially as described.

6. In a drilling-machine, the combination with a support, of a plate carried thereby and movable longitudinally thereon, drill-driving shafts journaled in said plate and having on one end blocks and on the other end slotted heads, a drill-carrying plate removably mounted on said longitudinally-movable plate, drills journaled on said drill-carrying plate and having heads provided with keys adapted to engage said slotted heads, springs mounted on said longitudinally-movable plate and adapted normally to bear on said blocks and by said engagement therewith to hold said shafts in such position that the keys on the heads of said drills may enter said slots when said drill-carrying plate is placed in position, or may be free to move out of said slots when said drill-carrying plate is withdrawn, means for freeing said springs from said blocks, and means for locking said drill-carrying plate in position on said longitudinally-movable plate, substantially as described.

7. In a drilling-machine, the combination of a drill-carrying frame comprising three or more sections hinged together, the hinge-axes of said sections being parallel with each other, a longitudinally-movable drill-supporting plate carried by the outer of said sections, a plurality of drills carried by said drill-supporting plate, and means for operating said drills.

8. In a drilling-machine, a drill-carrying frame comprising three or more sections hinged together, the hinge-axes of said sections being parallel with each other, a longitudinally-movable drill-supporting plate carried by the outer of said sections, a plurality of drills detachably connected to said plate, and means for operating said drill.

9. In a drilling-machine, a drill-carrying frame comprising three or more sections hinged together, the hinge-axes of said sections being parallel with each other, a longitudinally-movable drill-supporting plate carried by the outer of said sections, a plurality of flexible drill-shanks provided at their lower ends with integral drills journaled on and carried by said plate and movable therewith, said drill-shanks converging in curves from their upper ends toward their lower ends and parallel with each other at their operative ends, and means for operating said drills.

10. In a drill, the combination with a support, a sliding plate mounted on said support and movable longitudinally of itself thereon, a plurality of shafts journaled on said sliding plate, and pulleys secured to said shafts, of a second plate removably mounted on said sliding plate, a plurality of drill-supporting shafts adapted to engage said first shafts at one end and receive each a drill-shank at its other end, flexible drill-shanks mounted in said drill-supporting shafts, converging in gradual curves toward their lower ends and parallel at their lower ends, and provided with integral drills at their lower ends, and supports in which said drill-shanks are journaled, secured to said second plate and adapted to rotatably support said drill-shanks in converging curves, substantially as described.

11. In a drilling-machine, the combination with a support, a sliding plate carried by said support and movable longitudinally of itself thereon, shafts journaled on said sliding plate and provided at one end with slotted heads, and means for rotating said shafts, of a second plate removably secured to said sliding plate, drill-shafts journaled on said second plate and provided with heads adapted to engage said slotted heads when said second plate is placed in position, and drills carried by said drill-shafts, substantially as described.

12. In a drilling-machine, the combination with a support, a sliding plate carried by said support and movable longitudinally of itself thereon, shafts journaled on said plate and provided at one end with slotted heads, means for rotating said shafts, and means for holding the slotted heads of said shafts in engaging position when said shafts are at rest, of a second plate removably secured to said sliding plate, drill-shafts journaled on said second plate and provided with heads adapted to engage said slotted heads when said second plate is placed in position, and drills carried by said drill-shafts, substantially as described.

13. In a drilling-machine, the combination with a support, a sliding plate carried by said support and movable longitudinally of itself thereon, shafts journaled on said plate and provided at one end with slotted heads, means for rotating said shafts, and means for holding the slotted heads of said shafts in engaging position when said shafts are at rest, of a second plate removably secured to said sliding plate, drill-shafts journaled on said second plate and provided with heads adapted to engage said slotted heads when said second plate is placed in position, drills carried by said drill-shafts and provided with flexible, integral shanks, and journals mounted on said plate, in which said drill-shafts turn, and adapted to support said flexible drill-shafts on said plate with their lower ends relatively closer together and parallel with each other, and thence diverging in curves to their points of engagement with said drill-shafts, substantially as described.

14. In a drilling-machine, a drill-carrying frame comprising three or more sections hinged together, the hinge-axes of said sections being parallel with each other, and drilling mechanism arranged transversely across the end of the outer section of said frame.

15. In a drilling-machine, a drill-carrying frame comprising three or more sections hinged together end to end, the hinge-axes of said sections being parallel with each other, and drilling mechanism arranged transversely across the end of the outer section of said frame.

THEODORE C. HANSEN.

Witnesses:
CHARLES E. PICKARD,
JULIA M. BRISTOL.